UNITED STATES PATENT OFFICE.

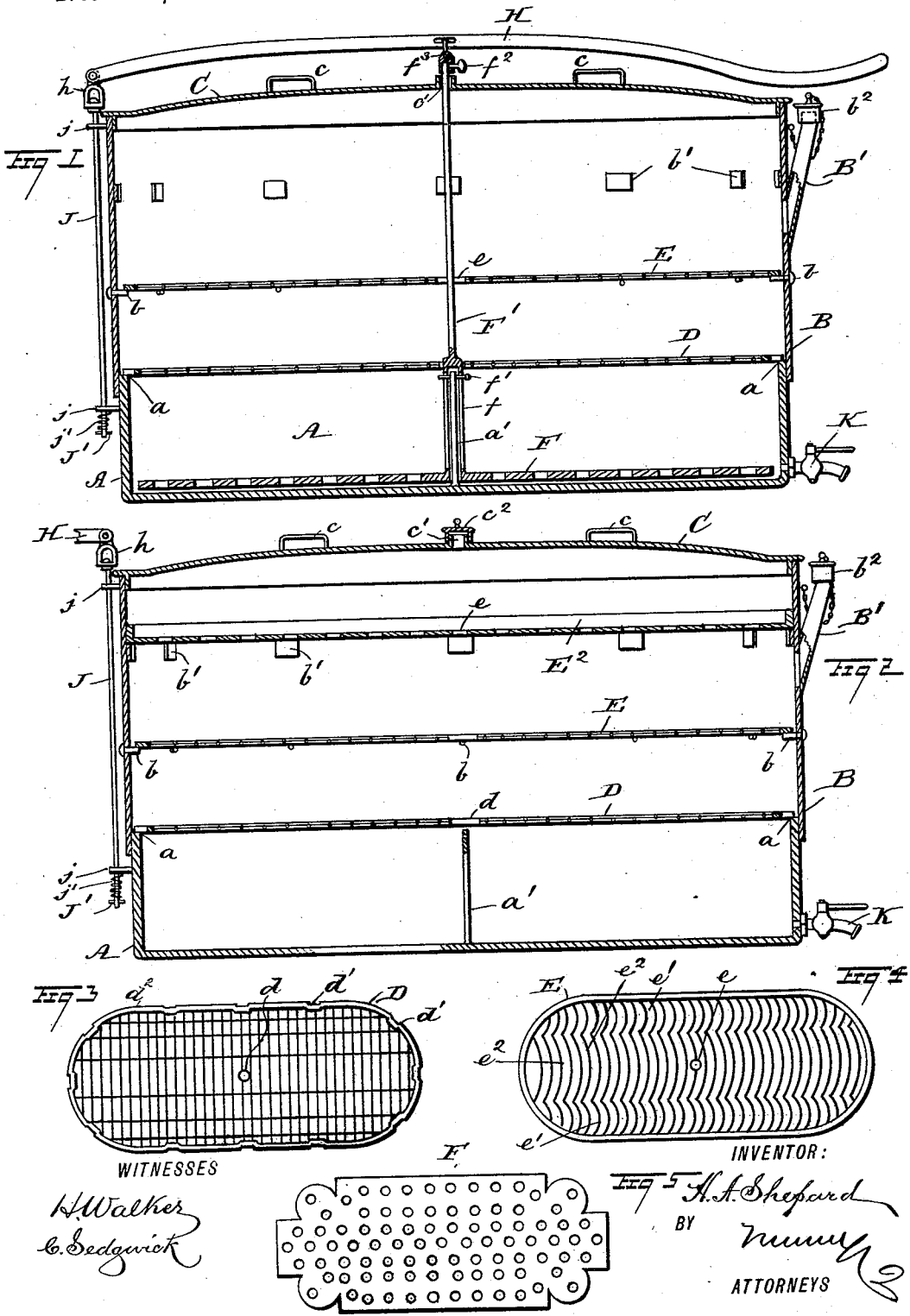

HULDAH A. SHEPARD, OF NELSONVILLE, OHIO.

COMBINED STEAM-COOKER AND DISH-WASHER.

SPECIFICATION forming part of Letters Patent No. 457,224, dated August 4, 1891.

Application filed January 8, 1891. Serial No. 377,128. (No model.)

*To all whom it may concern:*

Be it known that I, HULDAH A. SHEPARD, of Nelsonville, in the county of Athens and State of Ohio, have invented a new and Improved Combined Steam-Cooker and Dish-Washer, of which the following is a full, clear, and exact description.

My invention relates to improvements in steam-cookers and dish-washers; and the object of my invention is to produce a simple and convenient apparatus in which large quantities of food may be cooked and which may be easily changed from a cooker into a dish-washer, so that a quantity of dishes may be easily and thoroughly washed therein.

To this end my invention consists in certain features of construction and combinations of parts, which will be hereinafter described and claimed.

Reference is to be had to the accompanying drawings, forming a part of this specification, in which similar letters of reference indicate corresponding parts in all the figures.

Figure 1 is a vertical longitudinal section of the invention, showing it arranged for washing dishes. Fig. 2 is a vertical longitudinal section showing it arranged for cooking purposes. Fig. 3 is a detail plan view of the lower shelf or partition. Fig. 4 is a detail plan view of the middle partition, and Fig. 5 is a plan view of the dasher.

The device is shaped generally like an ordinary wash-boiler, and the bottom portion A is made, preferably, of copper, the top $a$ of which fits within the body portion B, which is preferably made of tin, and the top of the copper portion thus forms a support for the lower shelf or partition. At intervals in the body portion and in the central part are inwardly-projecting rivets $b$, which serve as supports for the middle shelf or partition, and above these rivets are brackets $b'$, which are fixed to the wall of the body and support the upper shelf. The body portion is provided with a suitable nozzle $B'$, through which the steam may escape, and the nozzle has a cover $b^2$ to close the end of it.

The device is closed by a removable cover C, which fits closely thereon, the cover having convenient handles $c$, and having a central perforation $c'$, which is closed by a cover $c^2$ when the device is used for cooking purposes and through which the dasher-rod extends when the device is used as a dish-washer.

The device is provided with a series of removable perforated partitions or shelves for supporting dishes and food, and any number may be used, although three is a convenient number and are enough for any ordinary purpose. The lower shelf D comprises a flange $d^2$, which is shaped to fit the inner sides of the apparatus and rest upon the top of the bottom portion A, and the flange is provided with cross-wires which extend transversely and longitudinally from side to side and from end to end and which form the body of the partition. The partition has a central perforation $d$, through which the dasher-rod works, and at intervals in the edge of the partition are nicks $d'$, which are adapted to pass over the rivets $b$ and permit the removal of the partition.

The middle partition E is adapted to rest upon rivets $b$ and comprises an outer flange shaped to fit the body of the apparatus, and has a central perforation $e$ to receive the dasher-rod. The sides of the partition are connected by cross wires or rods, which are curved near the edges, as shown at $e'$, so as to receive saucers or small dessert-plates and hold them edgewise upon the partition, and the wires are curved in the center at $e^2$ to receive larger articles, such as ordinary plates.

The upper partition $E^2$ is used only for cooking purposes, and is simply a perforated shelf which rests upon the brackets $b'$, and which has a perforation $e$ in the center for the passage of the dasher-rod.

The dasher F is adapted to rest on the bottom of the apparatus and is provided with numerous perforations which permit the water to pass readily through it, and centrally fixed to the upper side of the dasher is a dasher-rod $F'$, which extends upward through the central perforations in the shelves or partitions and through the perforation in the cover C, and the lower end $f$ of the rod is enlarged and hollow, so as to fit over the guide-rod $a'$, which extends upward from the center of the apparatus. The enlarged end $f$ of the rod is slotted, and extending through the slot and through the upper end of the rod $a'$ is a pin $f'$, which will thus limit the upward movement of the dasher and prevent it from striking the lower partition. The upper end of the dasher-rod F' projects slightly through the cover C and terminates in a cap $f^3$, which is secured by a set-screw $f^2$, and the cap is pivoted by means of a link to a lever H, which extends longitudinally across the top of the apparatus and which is pivoted at one end to a swivel $h$, and the swivel is mounted on a rod J, which extends through eyes $j$ on one end of the apparatus. The rod J has a removable pin J' at its lower end, between which and the lower eye is a spiral spring $j'$, one end of which is secured to the eye and the other end bears against the pin. The spring will prevent excessive shock when the main lever is operated and the rod may be removed, if desired. At the lower portion of the apparatus is a faucet K, by means of which the water may be withdrawn from it.

The device is used as follows: When food is to be cooked, the device is placed on the fire. As many shelves are put in as is necessary. Sufficient water is placed in the device to generate the necessary amount of steam, and the food is placed upon the shelves, where it is cooked by the heat of the steam. When the food has been cooked, it may be removed and dishes to be washed may be placed in the device and washed without removing it from the fire.

The operation of washing dishes is as follows: The necessary amount of soap and water is placed in the device and the dishes are placed upon the shelves D and E, the plates and saucers being placed edgewise upon the shelves and cups, knives, and forks and other articles placed on top. The lever H is then raised and lowered, thus raising and lowering the rod F' and dasher F, and the movement of the dasher throws the soap and water over the dishes, and they will thus be rapidly washed.

When the cover is to be removed the set-screw $f^2$ is loosened and the lever H swung to one side, as shown in Fig. 2.

Having thus described my invention, I claim as new and desire to secure by Letters Patent—

1. A combined steam-cooker and dish-washer comprising a body having a suitable cover, a series of perforated shelves mounted in the body, and a vertically-movable dasher mounted beneath the shelves, substantially as described.

2. An apparatus of the character described, comprising a body having a removable cover, a series of perforated shelves mounted in the body, a vertically-movable dasher mounted beneath the shelves, and a lever mechanism for operating the dasher, substantially as described.

3. An apparatus of the character described, comprising a body having a removable perforated cover, a series of perforated shelves mounted in the body, a vertically-movable dasher mounted beneath the shelves, a dasher-rod secured to the dasher and extending upward through the shelves and cover, and a lever for operating the dasher-rod, substantially as described.

4. In an apparatus of the character described, the combination, with a body having a vertical guide-rod in the bottom and having a removable cover with a perforation therein, of a dasher mounted in the body, a dasher-rod secured to the dasher and extending upward through the cover, said rod being held to slide on the guide-rod, and a lever for operating the dasher-rod, substantially as described.

5. The combination, with the body and the dasher and dasher-rod therein, of the lever having means for attachment to the dasher-rod, and a spring-pressed rod mounted on one end of the body and connected by a swivel with the lever, substantially as described.

HULDAH A. SHEPARD.

Witnesses:
M. Q. SHEPARD,
H. S. COZAD.